United States Patent [19]

Brown et al.

[11] Patent Number: 5,110,613
[45] Date of Patent: May 5, 1992

[54] PROCESS OF MAKING MULTI-TEXTURED SNACK CHIPS

[75] Inventors: Robert A. Brown, Mason; Yen-Ping C. Hsieh; James L. Court, both of Cincinnati, all of Ohio

[73] Assignee: The Procter & Gamble Company, Cincinnati, Ohio

[21] Appl. No.: 635,089

[22] Filed: Dec. 28, 1990

[51] Int. Cl.⁵ ............................................. A21D 15/04
[52] U.S. Cl. ......................................... 426/549; 426/808
[58] Field of Search ........................ 426/549, 550, 808

[56] References Cited

U.S. PATENT DOCUMENTS

| | | | |
|---|---|---|---|
| 2,665,208 | 1/1954 | Spieser | 426/559 |
| 3,259,503 | 7/1966 | Tan et al. | 426/559 |
| 3,519,432 | 7/1970 | Succo et al. | 426/550 |
| 3,835,222 | 9/1974 | Wisdom et al. | 426/49 |
| 3,851,084 | 11/1974 | Rossen et al. | 426/559 |
| 3,886,291 | 5/1975 | Willard | 426/141 |
| 3,997,684 | 12/1976 | Willard | 426/550 |
| 3,998,975 | 12/1976 | Liepa | 426/550 |
| 4,221,842 | 9/1980 | Toft | 426/550 |
| 4,293,582 | 10/1981 | Hamann et al. | 426/637 |
| 4,645,679 | 2/1987 | Lee et al. | 426/560 |
| 4,752,493 | 6/1988 | Moriki | 426/559 |
| 4,756,920 | 7/1988 | Willard | 426/549 |
| 4,778,690 | 10/1988 | Sadel et al. | 426/560 |
| 4,834,996 | 5/1989 | Fazzolare et al. | 426/302 |
| 4,861,609 | 8/1989 | Willard et al. | 426/550 |
| 4,931,303 | 6/1990 | Holm et al. | 426/549 |

FOREIGN PATENT DOCUMENTS

| | | |
|---|---|---|
| 87158 | 10/1988 | European Pat. Off. . |
| 8402019A | 6/1984 | Netherlands . |
| 3709625A | 3/1987 | Netherlands . |
| 1306384 | 2/1973 | United Kingdom . |

*Primary Examiner*—Donald E. Czaja
*Assistant Examiner*—Helen Pratt
*Attorney, Agent, or Firm*—Gary M. Sutter; Ronald L. Hemingway; Richard C. Witte

[57] ABSTRACT

Multi-textured snack chips are made by first forming moist starch agglomerates, and then mixing the agglomerates with a dry starch material to make an agglomerate/starch composite containing agglomerates of moist starch and discrete regions of dry starch material. The agglomerate/starch composite is formed into chips and then baked and/or fried. The resulting snack chips have an initial crispness and a continued crunchiness.

15 Claims, 1 Drawing Sheet

PROCESS OF MAKING MULTI-TEXTURED SNACK CHIPS

BACKGROUND OF THE INVENTION

1. Field of the Invention

This invention relates to multi-textured snack chips, particularly potato chips, prepared from a dry starch material mixed with moist starch agglomerates. The invention also relates to a process for making the snack chips.

2. Description of the Related Art

Conventional potato chips have an initial crisp texture, but they become soft after chewing and lose their crunchiness. Kettle-type potato chips retain their crunchiness during chewing, but their initial texture is undesirably hard for most consumers. The conventional and kettle-type potato chips are both structurally and texturally homogenous within a given type of chip.

U.S. Pat. No. 2,665,208 to Spieser, issued Jan. 5, 1954, discloses a method of making foodstuffs by first cooking potatoes without adding water, then mixing in a dry starch, then working the mixture into a homogeneous mass, and then forming the mass into pieces which are fried in oil. A homogeneous mass of dough will produce products that are homogeneous in texture.

U.S. Pat. No. 3,835,222 to Wisdom et al., issued Sept. 10, 1974, discloses a process for producing potato chips that are homogeneous in color, texture, flavor, solids content, and oil content. After a potato dough is made, it is admixed with other starch containing materials such as rice flour, tapioca flour, or potato starch. However, water is added along with the starch material and the ingredients are mixed into a homogenous, hydrated mass before being formed into chips and fried in oil.

U.S. Pat. Nos. 3,886,291 and 3,997,684 to Willard, issued May 27, 1975 and Dec. 14, 1976, disclose fried potato snacks prepared by mixing cooked potato solids with raw potato starch, adding water to form a dough, extruding pieces from the dough, and frying the pieces to form an expanded fried potato snack. The fried potato snacks have a relatively porous internal structure encased in a continuous relatively dense exterior surface layer of fried potato solids, not a texture having discrete crisp regions intermixed with discrete crunchy regions throughout the snacks.

U.S. Pat. No. 4,293,582 to Hamann et al., issued Oct. 6, 1981, discloses a potato dough for making french fries, made from 45-75% cooked, mashed potatoes, 9-20% dehydrated potato flakes, 0.12-2.0% liquid oil, and 17-27% aqueous slurry including a binding agent. The mashed potatoes, liquid oil, aqueous slurry, dry ingredients and potato flakes are mixed together to form a dough, then the dough is kneaded and formed or extruded into the desired shape for frying. This process will not produce a product having discrete regions of crisp texture and discrete regions of crunchy texture.

U.S. Pat. No. 4,752,493 to Moriki, issued Jun. 21, 1988, discloses expanded hollow snacks made from a dough containing a mixture of "farinaceous raw material having small swelling capacity" (e.g., wheat, rye, maize, rice) and "farinaceous raw material having large swelling capacity" (e.g., potato, tapioca).

U.S. Pat. No. 4,834,996 to Fazzolare et al., issued May 30, 1989, discloses a baked snack food made from a dough containing a starch such as potato, corn, rice, tapioca, or wheat. Dough pieces are baked in a conventional oven, during which time the exterior layer of the dough is said to cook rapidly and trap steam in the interior portion of the dough.

U.S. Pat. No. 4,861,609 to Willard et al., issued Aug. 29, 1989, discloses fried expanded snack products made from a dough containing: (a) finely divided starch-containing solids such as potatoes, corn, wheat or rice which are mixed with water; and (b) dry cracked cereal grains having a particle size larger than the average particle size of the finely divided starch. The larger particles act as vents to allow steam to escape, thereby reducing undesirable puffing of the snack during frying. The product will not have sizable discrete regions of crisp texture and crunchy texture.

European Patent Application 0,324,460 of Willard et al., published Jul. 19, 1989, discloses fabricated snack chips made from a dough which is treated by exposure to an airstream or heat so as to create a moisture differential between the treated surface of the dough and its interior. This treatment is said to control the amount of surface bubbling of the chips when they are fried.

Danish Patent Application 3709-625-A, published Mar. 24, 1987 (Abstract), discloses a dough for preparing chips made from flour, water, salt, eggs, and dry potato.

Netherlands Patent Application 8402-019-A, published Jun. 26, 1984 (Abstract), discloses a potato-based food product made from pre-cooked and modified starch mixed with dehydrated potato flakes.

The above-described patents do not disclose a method of making snack chips having discrete regions of crisp texture and crunchy texture within a chip, so that the snack chips provide an initial crisp texture with a continued crunchy texture after chewing. Neither do the conventional or kettle-type potato chips provide these advantages.

SUMMARY OF THE INVENTION

The present invention describes a process for preparing snack chips comprising the steps of:

(a) mixing a starch material with water to form moist starch agglomerates comprising from about 25% to about 55% water by weight; then (b) mixing the moist starch agglomerates with a dry starch material containing not more than about 20% water by weight to form an agglomerate/starch composite comprising from about 50% to about 95% moist starch agglomerates by weight and from about 5% to about 50% dry starch material by weight; wherein the mixing is conducted so that the agglomerate/starch composite comprises agglomerates of moist starch and discrete regions of dry starch material uniformly dispersed throughout the agglomerates, and so that the dry starch material after mixing contains not more than about 30% water by weight, and the moisture content of the dry starch material after mixing is at least about 5 percentage points less than the moisture content of the moist starch agglomerates after mixing; then (c) forming the agglomerate/starch composite into chip-like pieces; and then (d) cooking the pieces until they are crisp, wherein the cooking process is selected from the group consisting of baking, frying, and combinations thereof.

Unlike conventional and kettle-type potato chips, the snack chips of this invention are multi-textured within a given chip, containing portions of light crispy texture and portions of dense crunchy texture. As a result, the present snack chips beneficially provide the initial crispness of a conventional potato chip and the continued crunchiness without the hardness of a kettle-type potato chip.

DESCRIPTION OF THE PREFERRED EMBODIMENTS

Figure 1:
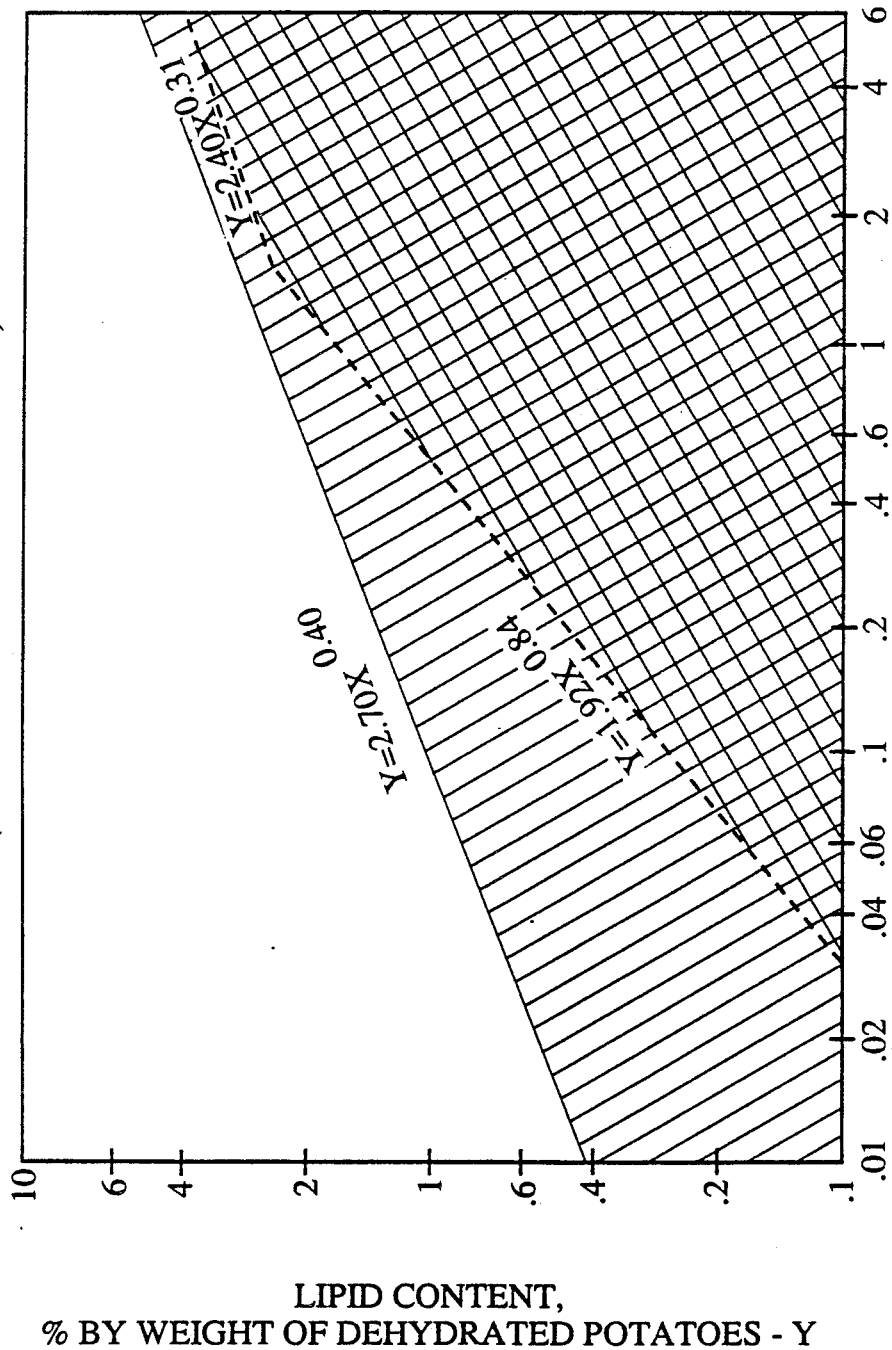
FIG. 1 presents graphically the relationship between the lipid content and the iodine index of the dehydrated cooked potatoes used to make the preferred moist starch agglomerates of the invention.

1. Preparing Moist Starch Agglomerates a. The Starch Material

The first step in preparing snack chips according to the present invention involves mixing a starch material with water to form moist starch agglomerates. Various types of starches (tubers and grains) may be used to create different multi-textured and flavored snack chips. For example, suitable starch materials include, but are not limited to, dehydrated potatoes, rice starch, tapioca starch, peanut flour, corn starch, wheat starch, oat starch, and mixtures thereof.

The preferred starch material for use in the snack chips is dehydrated cooked potatoes. U.S. Pat. No. 3,998,975 to Liepa, issued Dec. 21, 1976 (incorporated by reference herein) discloses a potato dough which is the preferred moist starch for making the moist starch agglomerates of the present invention. The potato dough is made from dehydrated cooked potatoes and water as described at col. 3, line 29 to col. 4, line 17 of the Liepa patent. The dehydrated cooked potatoes used in the invention can be either in flaked, granular, or powdered form (potato flour). Dehydrated potato flakes typically have a moisture content of about 7% by weight. The potato cells in the flakes are substantially intact and thus there is a minimum of free starch. Dehydrated potatoes in granular form have a moisture content of about 6% by weight and are composed of substantially unicellular potato particles which have their cell walls intact and which are capable of passing through about a No. 60 to about a No. 80 U.S. series sieve. Potato flour is made by drying cooked mashed potatoes to a moisture level of about 6% by weight and grinding the dried product to a given particle size, generally from about 70 to about 180 microns. Unlike the dehydrated potato flakes and granules described above, however, potato flour is composed of substantially 100% ruptured potato cells. The dehydrated potatoes used in the present invention preferably comprise from about 25% to about 100% potato flakes and from about 0% to about 75% potato granules.

The most preferred potato dough for use in the present invention is made from dehydrated potatoes which have their iodine index and lipid content adjusted as described in the Liepa patent. Such dehydrated potatoes provide a very coherent, workable dough, and they also impart optimum taste and texture properties to the resulting snack chips.

The iodine index of the dehydrated potatoes is a measure of the available free starch. At col. 4, line 54, to col. 5, line 28, the Liepa patent describes the method for determining the iodine index of a sample of dehydrated cooked potatoes. Dehydrated potatoes having an iodine index of from about 0.01 to about 6 are used to prepare a preferred potato dough for making the present snack chips. Dehydrated potatoes which do not have iodine indexes within this range can be adjusted by pulverizing or grinding at least a part of the dehydrated potatoes in a hammer mill or other suitable comminuting device to rupture at least some of the potato cells and thereby provide free starch, which is reflected by an increase in the iodine index of the dehydrated potatoes.

As discussed at col. 6, lines 1–18 of the Liepa patent, another factor which effects both the workability of the dough and the eating qualities of the snack chips is the lipid content of the dehydrated potato-water mixture. The lipid content of dehydrated potatoes is usually well below about 1% but it can be increased (when desired) to any higher level by the addition of a suitable amount of fatty substances such as, for example, mono-, di-, and triglycerides of fatty acids, such as monopalmitin, monostearate, monoolein, dipalmitin, and tripalmitin, and partial fatty esters of glycols, such as propylene glycol monostearate and monobehenate. Preferred lipids are cottonseed oil and corn oil. The lipid can be added to the dehydrated potatoes or it can be added to the water. However, the lipid should be uniformly dispersed in whichever component it is mixed. The maximum lipid content of the dough is about 6% by weight of the dehydrated potatoes for an iodine index of about 6.

The preferred relationship between the lipid content and the iodine index of the dehydrated potatoes is shown in the graph in FIG. 1: preferably the dehydrated potato-water mixture has a lipid content and the dehydrated potatoes have an iodine index which together define a point on or below the solid line (i.e., the lined area). The Liepa patent describes this relationship between the lipid content and the iodine index more fully at col. 6, line 19 to col. 7, line 26.

b. Forming Moist Starch Agglomerates

The starch material is mixed with water (preferably heated) to form moist starch agglomerates comprising from about 25% to about 55% water by weight (and from about 45% to about 75% starch material by weight). For example, the moist starch can be made into agglomerates that have a spheroidal shape fairly uniform in size. By an "agglomerate" is meant a rounded mass of the moist starch. When the starch material is mixed with the water, instead of forming a single mass of dough, the moist starch is formed into numerous separate small masses or dough balls termed "agglomerates". The moist starch agglomerates should have a minimum linear diameter of about 0.025 inch (0.635 mm) and a maximum linear diameter of about 0.25 inch (6.35 mm) after they are agglomerated and before sheeting. (These measurement terms are defined in Section 3 hereinbelow.) It is acceptable for an agglomerate to occasionally fall outside these diameter measurements as long as it does not occur very often, and as long as the actual measurements are not very different from the above-described measurements. Typically the agglomerating equipment used will make fairly uniform sized agglomerates.

Various types of agglomerating equipment known to the art can be used to make the moist starch agglomerates. Most preferred is a Double Helix TS-8 Turbulizer agglomerator manufactured by Bepex Corp., 333 N.E. Taft St., Minneapolis, Minn. 55413. Also preferred is a pin mixer, different models of which are manufactured by various companies. Other suitable agglomerating equipment include a plow mixer, a pelletizer, a zig zag blender, and a Schugi mixer.

As an illustration of a suitable method of forming moist starch agglomerates of the present invention, potato flour and fat are mixed together using a Hobart model A-200TG mixer (or any other dry mixing equipment). The resulting mixture and a stream of water at 180° F. (82° C.) are then continuously mixed and agglomerated in a Double Helix TS-8 Turbulizer manufactured by Bepex Corp., which is jacketed at 110° F. (43° C.) and rotates at 1050 rpms. The paddle orientation of the Turbulizer is such that the agglomerates have a minimum linear diameter of 0.025 inch (0.635 mm) and a maximum linear diameter of 0.25 inch (6.35 mm).

The total moisture content of the moist starch agglomerates (including the moisture content of the beginning starch material) can range from about 25% to about 55% by weight and is preferably from about 35% to about 45% by weight.

2. Mixing a Dry Starch Material with the Moist Starch Agglomerates

The moist starch agglomerates described hereinabove are next mixed with a dry starch material to form an agglomerate/starch composite comprising from about 50% to about 95% moist starch agglomerates by weight and from about 5% to about 50% dry starch material by weight. The dry starch material before mixing should contain not more than about 20% water by weight. Like for the moist starch agglomerates, various types of starches may be used as the dry starch material; for example, suitable starch materials include, but are not limited to, dehydrated potatoes, rice starch, tapioca starch, peanut flour, corn starch, wheat starch, oat starch, and mixtures thereof.

The novel texture of the present snack chips is made by mixing the moist starch agglomerates and the dry starch material in such a manner that the resulting agglomerate/starch composite comprises agglomerates of moist starch and discrete regions of dry starch material uniformly dispersed throughout the moist starch agglomerates. The mixing should be low work input (low shear) and for a limited time period. The dry starch material is dispersed throughout but remains relatively unhydrated and discrete from the moist starch agglomerates. In order to achieve the textural benefit of the present invention, the dry starch material after mixing with the moist starch agglomerates should contain not more than about 30% water by weight.

Additionally, the moisture content of the dry starch material after mixing should be at least about 5 percentage points less than the moisture content of the moist starch agglomerates after mixing. By "at least 5 percentage points less", as used herein, is meant, e.g., that if the moisture content of the moist starch agglomerates after mixing is 35% water by weight of the moist starch agglomerates, then the moisture content of the dry starch material after mixing should be 30% water or less by weight of the dry starch material. Preferably the moisture content of the dry starch material after mixing is at least about 10 percentage points less than the moisture content of the moist starch agglomerates after mixing, more preferably at least about 15 percentage points less, more preferably at least about 20 percentage points less, and most preferably about 25-40 percentage points less.

As an example of preparing the agglomerate/starch composite, a moist agglomerated potato dough is mixed with dry potato flour for about 30 seconds using a pin mixer until the flour is uniformly dispersed throughout the agglomerates, but remains unhydrated and discrete.

Various types of mixers can be used for mixing the dry starch material with the moist starch agglomerates. Most preferred is a Model TR6 Pin Mixer, manufactured by Teledyne Readco. Suitable mixers include the following batch mixers: Hobart, zig zag, ribbon and plow; and the following continuous mixers: paddle, Turbulizer, pin, plow, ribbon and zig zag.

The purpose of the mixing is to uniformly disperse the dry starch material throughout the moist starch agglomerates, but to avoid excessive mixing which would cause too much intermixture of the agglomerates and the dry starch material, resulting in too much moisture transfer into the dry starch material. These components are mixed correctly when the sheet formed from the agglomerate/starch composite exhibits a good contrast between the moist starch areas and the dry starch areas. Of course, the proof is in the resulting fried snack chips, which should be light and crispy and have an extended crunch. It has been found that the maximum mixing time should be about one minute; longer mixing results in too much moisture transfer from the moist starch regions into the dry starch regions, and the textural benefit of the invention is lost. Typically, the moist starch agglomerates and dry starch material are mixed about 30 seconds.

If desired, up to about 9% by weight, preferably about 2% to about 6% by weight, of the dry starch material can be replaced by non-potato food pieces which include, but are limited to, parsley; chives, garlic or garlic skins; white, red, green, or yellow onions or onion skins; tomatoes or tomato skins; carrots; dill; broccoli; red or green peppers or pepper skins; or mixtures thereof. The non-potato food pieces may be of any shape, but it is preferable that the pieces have the dimensions of between 0.002-0.500 inch (0.005-1.27 cm). Adding these ingredients can improve the taste, appearance and texture of the present snack chips. They can also aid in the escape of steam from the dry portions of the snack chips during cooking, thereby preventing puffing and promoting a crunchy texture.

Also, if desired, from about 0.5% to about 2.5%, by weight of the final snack chip product, of an emulsifier can be included in the moist starch agglomerates and/or the dry starch material. The emulsifier may be selected by one skilled in the art from any emulsifier or emulsifier blend available in the industry, according to the particular application and the attributes desired. A particularly preferred emulsifier has from about 30% to about 40% monoglycerides, and from about 12% to about 18% triglycerides, with the remainder being diglycerides. An emulsifier of this type is Myvatex Dough Control K Strengthener (manufactured by Eastman Chemical, a division of Eastman Kodak, Rochester, N.Y.). Other types of suitable emulsifiers include distilled monoglycerides produced by various manufacturers such as, for instance, Grinsted Products, Inc., Kansas City, Kans., and mono-diglycerides produced by various manufacturers such as, for instance, Durkee Foods Division, SCM Corporation, Joliet, Ill.

Shearing of the snack chip dough by processing equipment can cause the formation of an undesirable amount of bubbles. Adding lipids and emulsifiers to the snack chips can reduce this shearing and thereby reduce the amount of bubble formation in the dough. Preferably from about 0.5% to about 4% total lipids and emulsifiers are added by weight of the final snack chip. A smaller amount has little effect on bubble formation and a larger amount has an undesirable effect on the product texture.

Various seasonings and flavors can be added to the moist starch agglomerates and/or the dry starch material of the present snack chips, for example, salt, pepper, cheese flavor, onion flavor, barbecue flavor, or other seasonings and flavors. However, care must be taken in formulating snack chips with these materials, because dry seasonings and flavors tend to readily absorb water. Absorption of water from the moist agglomerates to the dry starch areas of the snack chips would produce chips having a more uniform moisture throughout, thereby reducing the crisp/crunchy textural dichotomy benefit of the chips. Adding too high a level of dry seasonings and flavors to the moist agglomerates could also reduce their moisture content and reduce the level of crispness of those areas of the snack chips.

3. Forming Chip-Like Pieces and Baking and/or Frying

After the agglomerate/starch composite is made, it is next sheeted, during which time the agglomerates are compressed and sheared to dissociate the starch-water matrix within the individual agglomerates and form a continuous matrix/sheet around discrete pockets of unhydrated starch material. After the agglomerate/starch composite is sheeted, the regions of dry starch material can be measured to make certain that the resulting snack chip will have the desired textural characteristics. The dry starch material regions are likely to be somewhat irregular in shape after sheeting. Therefore, they can be defined in terms of their minimum linear diameter and maximum linear diameter, as measured on the surface of the sheet. The "maximum linear diameter" of a dry starch material region is simply the largest diameter that can be found and measured for that region on the sheet surface. The "minimum linear diameter" is the smallest diameter that can be found for that region. After sheeting, the dry starch material regions should have a minimum linear diameter of about 0.015 inch (0.38 mm) and a maximum linear diameter of about 1.000 inch (25.4 mm) (each linear diameter for a particular region should be between about 0.015 inch [0.38 mm] and about 1.000 inch [25.4 mm]). (It is acceptable for a dry starch material region to occasionally fall outside these diameter measurements as long as it does not occur very often, and as long as the actual measurements are not very different from the above-described measurements.)

The minimum and maximum linear diameters are measured by direct measurements of enlarged images of the dry starch material regions. Linear measurements of the regions are made by using a scale placed on top of the region's image. Typically, a photograph of the sheet is taken and enlarged, and then the regions are measured by hand with a ruler.

Sheeting of the agglomerate/starch composite is done by passing the agglomerate/starch composite between spaced mill rolls to form a sheet of dough ranging in thickness from about 0.005 inch (0.13 mm) to about 0.1 inch (2.54 mm), and preferably from about 0.015 inch (0.38 mm) to about 0.030 inch (0.76 mm). The dough sheet so formed can be cut into elliptical pieces having the approximate size and shape of sliced potatoes. Other sizes and shapes of chips can also be formed.

After the chip pieces are formed, they are cooked until they are crisp to make the final snack chip products, where the cooking process is selected from the group consisting of baking, frying, and combinations thereof. It is preferred to bake the chips at a temperature between 300° F. (149° C.) and 450° F. (232° C.) for a time between 15 seconds and 120 seconds to skin the surface of the chips, prior to frying the chips to doneness. Baking prior to frying provides the advantage of heightening the multi-texture character of the present snacks chips. The skin formed by baking inhibits the rapid transport of steam from the portion of the composite made up of the moist starch agglomerates, resulting in a build-up of internal pressure which expands the structure during frying and yields a light crispy texture. In the portion of the agglomerate/starch composite made up of the dry starch material, no matrix exists to inhibit rapid transport of steam, and therefore it does not develop the internal pressure necessary to expand the structure and consequently yields a dense crunchy texture.

The textural quality of the snack chips will be affected by the air convection rate during baking. Higher convection rates increase the thickness of the skin formed. This is desirable for increasing the crisp/crunchy textural dichotomy of the snack chips. On the other hand, a too thick skin produces an overly tough texture. Preferably the air convection rate during baking is between about 0 feet/minute (0 meters/minute) and about 3,000 feet/minute (914.4 meters/minute) depending on exposure time and temperature, more preferably about 100–500 feet/minute (30.5–152.4 meters/minute), most preferably about 300 feet/minute (91.4 meters/minute).

The snack chips should not be exposed to a high moisture environment (e.g., steam) during baking. Moisture transfer from the air into the chips would make the chips less dual textured by reducing their crispness.

The method of preparation to yield multi-textured snack chips according to the present invention is not limited to partially baking, then frying. The chips can be fried only, baked only, or partially fried then baked. The thickness of the dough sheet is adjusted according to the preparation method. Chips that are only baked use a thicker sheet, chips that are baked and fried use a somewhat thinner sheet, and chips that are only fried use the thinnest sheet.

The chips can be fried in any conventional frying equipment suitable for snack chips. Apparatus such as that described in U.S. Pat. No. 3,808,962 to Liepa, issued May 7, 1974, incorporated by reference herein, can be used to produce uniformly shaped chips. This apparatus provides snack chips which have a surface confirmation and shape similar to conventional chips made by frying thin slices of raw potatoes. The frying is performed with the chips constrained between a pair of closely fitting, similarly configured shaping molds which have apertures to permit the hot frying fat to come into intimate contact with the chips.

The frying operation can be carried out with the frying fat at a temperature of from about 275° F. (135° C.) to about 400° F. (204° C.), preferably at a temperature of from about 315° F. (157° C.) to about 375° F. (191° C.), for a time of about 5 seconds to about 60 seconds, preferably about 5 seconds to about 30 seconds. The frying time is variable, and is adjusted according to the final chip moisture content. It is preferred to have a final moisture content in the chips of less than about 2% by weight. Final moisture content is also affected by the baking step. The frying time is also affected by the chip color, the thickness of the chip, the temperature of the frying oil, and the type of oil used.

Any edible cooking oil or shortening is a suitable medium for frying the chips. Liquid cottonseed oil is especially preferred. The frying can be done in conventional triglyceride oils, or, if desired, the frying can be done in low calorie fat-like materials such as those described in U.S. Pat. No. Nos. 3,600,186 to Mattson et al., issued May 12, 1970; 4,005,196 to Jandacek et al., issued Jan. 25, 1977 (all incorporated by reference herein); and European Patent Publication 0,236,288 to Bernhardt, published Sept. 9, 1987.

EXAMPLE 1

Snack chips according to the present invention are prepared as follows:

1. Formulation:

| Ingredients | Percentages |
| --- | --- |
| a. Moist Starch Agglomerates: | |
| Potato flakes | 56.38 (@ 6.00% H$_2$O) |
| Water | 41.67 |
| Potato granules | 1.15 (@ 6.00% H$_2$O) |
| Lipid | 0.80 |
| | 100.00% |
| b. Dry Starch Material: | |
| Potato flakes | 89.91 (@ 6.00% H$_2$O) |
| Potato granules | 10.09 (@ 6.00% H$_2$O) |
| | 100.00% |
| c. Final Agglomerate/Starch Composite: | |
| Potato flakes | 62.60 (@ 6.00% H$_2$O) |
| Water | 33.95 |
| Potato granules | 2.81 (@ 6.00% H$_2$O) |
| Lipid | 0.65 |
| | 100.00% |

2. Mixing

The flakes, granules, and lipid of the moist starch are preblended (50 lb. [22.7 kg] batches) in a Hobart model #V-1401 mixer for 20 minutes on speed 1. 203 grams of this preblend and 145 grams of hot water (175° F., 79° C.) are then mixed in a Cuisinart Food Processor model #DLC-7E for 45 seconds to form the moist starch agglomerates. The dry starch material is preblended (50 lb [22.7 kg] batches) in a Hobart model #V-1401 mixer for 20 minutes on speed 1. 160 grams of the moist starch agglomerates are then mixed by hand with 40 grams of the dry starch material in a small metal mixing bowl for 30 seconds. Care is taken to maintain a consistent agglomerate/dry starch distribution from batch to batch.

3. Milling and Cutting

The agglomerate/starch composite is sheeted using a 12 inch (0.305 meter) diameter two-roll mill at 11.2 feet (3.41 meters) per minute linear velocity. The roll surface temperatures are left uncontrolled at room temperature. The sheet width is approximately 10" (0.254 meter) wide and varies in sheet thickness from 0.018" (0.46 mm) to 0.030" (0.76 mm).

Oval-shaped chip pieces are cut from the sheet using a rotary cutter with a 10 inch (0.254 meter) diameter roll fitted with 32 cutters (4 across by 8 around). The cutters are oval in shape measuring 75×56 mm. The thickness of each chip is measured and screened for 0.023" (0.58 mm) to 0.025" (0.64 mm). The chips are wrapped in a foil and stored no longer than 5 minutes prior to baking.

4 Baking and Frying

The chips are placed on an open mesh sheet, twelve chips at a time, and baked at 400° F. (204° C.) for 45 seconds in a small counter-top forced air oven.

The baked chips are then placed immediately into closed, pre-heated shaping molds and fried. (The "shaping molds", as described in U.S. Pat. No. 3,808,962 to Liepa, issued May 7, 1974 [incorporated by reference herein], constrain the chips between a pair of closely-fitting, similarly configured shaping molds which have apertures to permit the hot frying fat to come into intimate contact with the chips. The shaping molds used here are made up of two sets of six molds spaced with washers to set the gap between the two sides of each mold at 0.115" [2.92 mm]).

| Parameter | Standard |
| --- | --- |
| Fry temp. | 350° F. (177° C.) |
| Charge | ~70 lbs (31.8 kg) |
| Oil type | Cottonseed oil |
| Shaping mold gap | ~0.115" (2.92 mm) |
| Fry time | 6 to 7 seconds |

The fried chips are then placed onto paper towels to drain and cool to room temperature. About 1% by weight salt is applied to the chips.

EXAMPLE 2

Snack chips according to the present invention are made as described in Example 1, except that during frying the chips are unconstrained instead of being constrained in the shaping molds. The formulation and mixing are the same as described in Example 1. In the milling step, the sheet thickness is 0.020" (0.51 mm) to 0.032" (0.82 mm) instead of 0.018" (0.46 mm) to 0.030" (0.76 mm). Similarly, the thickness of each chip is 0.025" (0.64 mm) to 0.027" (0.69 mm) instead of 0.023" (0.58 mm) to 0.025" (0.64 mm). Baking is done for 1 minute instead of 45 seconds as in Example 1. The baked chips are allowed to cool for 1 minute then free fried one at a time. A pair of tongs is used to keep the chip immersed in the oil by gently holding and waving the chip so as not to allow the chip to "curl-up". The frying time is 7 to 8 seconds for each chip.

EXAMPLE 3

If snack chips according to the present invention were to be made on an industrial scale, the following would be the preferred process.

The product formulation is essentially the same as described in Example 1, except that the lipid is divided between the moist starch agglomerates and the dry starch material. The throughput volume is greatly increased because of use of the larger production system. Potato flakes (about 94.76%), potato granules (about 4.25%), and lipid (about 0.98%) are fed from storage bins into a mixer and blended together. This blend has a moisture content of about 7% by weight. From the mixer, these ingredients are fed into two hoppers, about 80% of the total ingredients fed into a "wet dough hopper" and about 20% of the total ingredients fed into a "dry blend hopper". A hot water feed tank (170° F., 77° C.) and the wet dough hopper feed into a "wet dough mixer" which is a Double Helix TS-8 Turbulizer agglomerator manufactured by Bepex Corp. or other similar type of agglomerator. About 58% ingredients from the wet dough hopper and about 42% hot water are fed into the Turbulizer, and moist starch agglomerates are formed having a moisture content of about 40%. The agglomerates have a minimum linear diameter of 0.025 inch (0.635 mm) and a maximum linear diameter of 0.25 inch (6.35 mm). The ingredients in the dry blend hopper and the moist starch agglomerates are next fed into a "wet/dry dough mixer" in a ratio of about 20% dry blend and 80% agglomerates, the wet/dry mixer being a Model TR6 Pin Mixer manufactured by Teledyne/Readco or other similar type of mixer. The agglomerates and dry blend are mixed together for about 30 seconds to form an agglomerate/dry starch composite which comprises agglomerates of moist starch and discrete regions of dry starch material dispersed throughout the agglomerates. The agglomerate/dry starch composite is next rolled to a sheet thickness of about 0.02–0.03 inch (0.51–0.76 mm) and then cut into oval-shaped chip pieces as described in Example 1. After sheeting, the dry starch material regions have a minimum linear diameter of 0.015 inch (0.38 mm) and a maximum linear diameter of 1.0 inch (25.4 mm). The chips are baked at approximately 400° F. (204° C.) for 45 seconds and then fried in cottonseed oil or a similar oil at approximately 350° F. (177° C.) for 7 seconds before cooling, seasoning and/or salting, and packing.

What is claimed is:

1. A process for preparing snack chips comprising the steps of:
   (a) mixing a starch material with water to form moist starch agglomerates comprising from about 25% to about 55% water by weight; then
   (b) mixing the moist starch agglomerates with a dry starch material containing not more than about 20% water by weight to form an agglomerate/starch composite comprising from about 50% to about 95% moist starch agglomerates by weight and from about 5% to about 50% dry starch material by weight; wherein the mixing is conducted so that the agglomerate/starch composite comprises agglomerates of moist starch and discrete regions of dry starch material uniformly dispersed throughout the agglomerates, and so that the dry starch material after mixing contains not more than about 30% water by weight, and the moisture content of the dry starch material after mixing is at least about 5 percentage points less than the moisture content of the moist starch agglomerates after mixing; then
   (c) forming the agglomerate/starch composite into chip-like pieces; and then
   (d) cooking the pieces until they are crisp, wherein the cooking process is selected from the group consisting of baking, frying, and combinations thereof.

2. A process according to claim 1 wherein the starch material of step (a) and the dry starch material of step (b) are selected from the group consisting of dehydrated potatoes, tapioca starch, peanut flour, corn starch, wheat starch, oat starch, rice starch, and mixtures thereof.

3. A process according to claim 1 wherein the chip-like pieces are first baked at a temperature between about 300° F. (149° C.) and about 450° F. (232° C.) for a time between about 15 seconds and about 120 seconds, and then fried until they are crisp.

4. A process according to claim wherein the agglomerate/starch composite comprises from about 65% to about 95% moist starch agglomerates and from about 5% to about 35% dry starch material.

5. A process according to claim 4 wherein the agglomerate/starch composite comprises from about 75% to about 85% moist starch agglomerates and from about 15% to about 25% dry starch material.

6. A process according to claim 1 wherein the moist starch agglomerates of step (a) comprise from about 35% to about 45% water by weight.

7. A process according to claim 1 wherein the moist starch agglomerates are admixed in step (a) by a mixing process that produces agglomerates having a minimum linear diameter of about 0.025 inch (0.64 mm) and a maximum linear diameter of about 0.25 inch (6.35 mm).

8. A process according to claim 1 wherein the chip-like pieces of step (c) are formed by rolling the agglomerate/starch composite into a flat sheet having a thickness between about 0.015 inch (0.38 mm) and about 0.030 inch (0.76 mm), and then cutting chip-like pieces from the sheet.

9. A process according to claim 1 wherein the starch material of step (a) is dehydrated cooked potatoes.

10. A process according to claim 9 wherein the iodine index and the lipid content of the dehydrated cooked potatoes are adjusted to provide a lipid content and an iodine index which are defined by points within the lined area of FIG. 1.

11. A process according to claim 9 wherein the dehydrated cooked potatoes comprise from about 25% to about 100% potato flakes and from about 0% to about 75% potato granules.

12. A process according to claim 1 wherein from about 2% to about 6% by weight of the dry starch material is replaced by non-potato food pieces selected from the group consisting of parsley, chives, garlic, garlic skins, onions, onion skins, tomatoes, tomato skins, carrots, dill, broccoli, peppers, pepper skins, and mixtures thereof.

13. A process according to claim 1 wherein the snack chip contains from about 0.5% to about 2.5% emulsifier by weight of the snack chip.

14. A process according to claim 1 wherein the snack chip contains from about 0.5% to about 4% total lipids and emulsifiers by weight of the snack chip.

15. A process according to claim 1 wherein the snack chip is baked, and wherein the air convection rate during baking is between about 100 feet/minute (30.5 meters/minute) and about 500 feet/minute (152.4 meters/minute).

* * * * *